United States Patent [19]  
Miyasaka et al.

[11] Patent Number: 4,735,837  
[45] Date of Patent: Apr. 5, 1988

[54] REMOVABLE ADHESIVE SHEET

[75] Inventors: Hiroyasu Miyasaka, Tanashi; Yasuaki Kitazaki, Iruma; Tetsuaki Matsuda, Kawagoe; Junichi Kobayashi, Tokorozawa, all of Japan

[73] Assignee: Nichiban Company Limited, Tokyo, Japan

[21] Appl. No.: 763,675

[22] Filed: Aug. 8, 1985

[30] Foreign Application Priority Data

Apr. 8, 1985 [JP] Japan ............... 60-51157[U]

[51] Int. Cl.⁴ .............. A61F 13/02; B32B 27/14; B32B 5/22; B32B 5/16
[52] U.S. Cl. .................................. 428/40; 428/41; 428/42; 428/317.5; 428/317.9; 428/323; 428/325; 428/402; 428/406; 428/192; 428/198
[58] Field of Search ............ 428/40, 41, 42, 323, 428/325, 402, 406, 317.5, 317.9, 192, 198

[56] References Cited

U.S. PATENT DOCUMENTS

| | | | |
|---|---|---|---|
| 3,386,846 | 6/1968 | Lones | 117/11 |
| 3,691,140 | 9/1972 | Silver | 260/78.5 |
| 3,857,731 | 12/1974 | Merrill, Jr. et al. | 117/122 PA |
| 4,415,615 | 11/1983 | Esmay et al. | 428/40 |
| 4,442,156 | 4/1984 | Yamaguchi | 428/142 |
| 4,525,416 | 6/1985 | Hammerschmidt et al. | 428/220 |
| 4,556,595 | 12/1985 | Ochi | 428/143 |
| 4,587,152 | 5/1986 | Gleichenhagen et al. | 428/195 |
| 4,589,590 | 5/1986 | McGuire et al. | 229/92.8 |

FOREIGN PATENT DOCUMENTS 452479  5/1968  Switzerland ............... 428/192

Primary Examiner—John E. Kittle  
Assistant Examiner—Patrick J. Ryan  
Attorney, Agent, or Firm—Schwartz, Jeffery, Schwaab, Mack, Blumenthal & Evans

[57] ABSTRACT

A removable adhesive sheet comprising a substrate (A) and an adhesive composition layer which comprises elastic micro-balls (B) and an adhesive (C), the adhesive composition layer being formed on an adhesive layer forming surface of the substrate, wherein the mixing proportion of the elastic micro-balls (B) to the adhesive (C) in the adhesive composition layer is 1:10 to 10:1 in terms of weight ratio, and the protrusive areas of the elastic micro-balls (B) partially protruding from the surface of the adhesive composition layer is entirely covered with the adhesive (C) has an adhesion capability that is not lowered through a frequent repetition of bonding to and removing from an adherend.

13 Claims, 5 Drawing Sheets

REMOVABLE ADHESIVE SHEET

BACKGROUND OF THE INVENTION

The present invention relates to a removable adhesive sheet, more particularly to a removable adhesive sheet whose adhesion capability does not decline with a frequent repetition of bonding to and removing from various adherends.

A conventional adhesive sheet has generally been formed by coating the adhesive layer forming surface of a paper, a plastic or a metal substrate with an adhesive. However, in such a sheet, the adhesive layer forming surface has been coated smoothly all over with the adhesive, which, although permitting bonding of the sheet to an adherend, does not permit removal from and rebonding to that adherend (or to some other adherend) repeatedly. this is because, due to so-called face adhesion of the adhesive sheet to the adherend, the adherend is partially peeled off to cover the surface of the adhesive or conversely the adhesive partially remains on the adherend when the sheet is removed, resulting in the remarkable reduction of adhesive force of the adhesive sheet through repetition of bonding and removing thereof.

Therefore, various adhesive sheets have been developed in which a concept of so-called point adhesion, instead of face adhesion, is applied. For these sheets, removal is made possible by making uneven the surfaces of the adhesive layers or by other methods reducing the areas of the sheets which come into contact with adherends. Among such removable adhesive sheets, there are, for example, a sheet to which an adhesive is applied in lines or in dots (refer to Japanese Provisional Utility Model Publn. Nos. 67060/1973, 54546/1984 and 133641/1984), a sheet whose adhesive layer itself is formed unevenly (refer to Japanese Provisional Utility Model Publn. Nos. 17561/1975 and 44750/1984), and a sheet in which an uneven portion is formed on its substrate and an adhesive is applied thereto (refer to Japanese Provisional Utility Model Publn. Nos. 116453/1974 and 135474/78, Japanese Utility Model Publication Nos. 4460/1976 and 3396/1977; Japanese Provisional Utility Model Publication No. 45340/1983 and U.S. Pat. No. 3,386,846).

The above-described adhesive sheets can be bonded and removed repeatedly many times. In such adhesive sheets, however, the effective area capable of coming into contact with an adherend had been merely reduced for the purpose of facilitating the removal of the sheet, and hence the adhesive force thereof to an adherend has been insufficient. In addition, the adhesive itself, which is capable of coming into contact with the adherend at the protrusive portions of the uneven surfaces of the adhesive sheets, tends to be physically released, and therefore such adhesive sheets become unusable when they are bonded to and removed from an adherend only a few times.

BRIEF DESCRIPTION OF THE DRAWING

FIG. 2-1 is a modified example of FIG. 2. FIG. 2-2 is an another modified example of FIG. 2.

SUMMARY OF THE INVENTION

An object of the present invention is to provide a removable adhesive sheet whose adhesion capability is not lowered through a frequent repetition of bonding to and removing from an adherend.

The present invention is characterized in that a removable adhesive sheet comprises a substrate (A) and an adhesive composition layer which comprises elastic micro-balls (B) and an adhesive (C), with the adhesive composition layer being formed on an adhesive layer forming surface of the substrate, wherein the mixing proportion of said elastic micro-balls (B) to said adhesive (C) in the adhesive composition layer is 1:10 to 10:1 in terms of weight ratio, and the protrusive portions of said elastic micro-balls (B partially protruding from the surface of the adhesive composition layer are entirely covered with said adhesive (C).

Thus key characteristics of the present invention are the forming of an adhesive composition layer (hereinafter referred to as an adhesive layer) formulated of elastic micro-balls and an adhesive in a fixed proportion on a substrate, and the covering of all protrusive portions of the elastic micro-balls protruding from the surface of the adhesive layer with the adhesive.

In the following, the present invention will be explained in further detail.

DESCRIPTION OF THE PREFERRED EMBODIMENTS

A removable adhesive sheet of the present invention means a sheet that comprises a substrate which permits hand-writing or printing thereon and an adhesive layer formed thereon, and that is capable of repeating rebonding to any place which is most convenient to a user.

Figure 1:
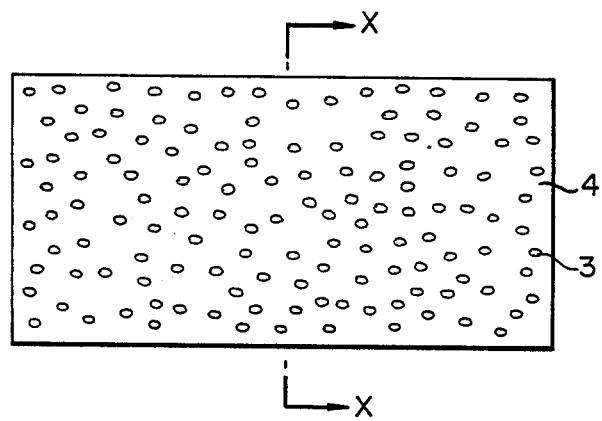
FIG. 1 is a plan view of a removable adhesive sheet of the present invention.
Figure 2:
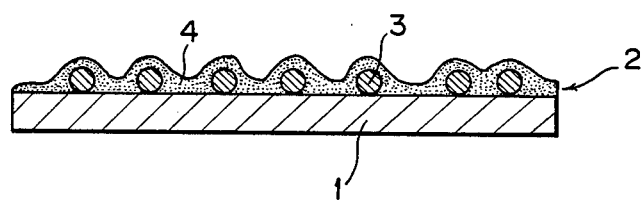
FIG. 2 is an enlarged cross-sectional view of FIG. 1 along the line X—X.
Figures 1, 2:
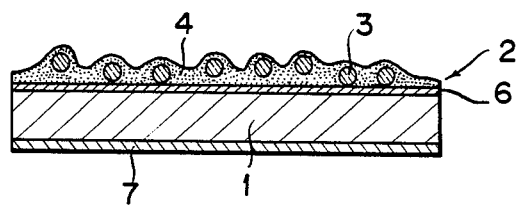
Figure 2:
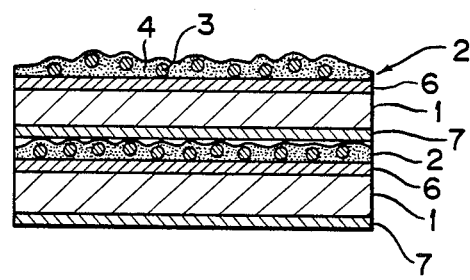

A typical embodiment of a removable adhesive sheet of the present invention is shown in FIGS. 1 and 2. FIG. 2-1 is a modified example of FIG. 2, namely an enlarged cross-sectional view (of FIG. 1 along the line X—X) in the case when a primer coating layer 6 and a release agent layer 7 are employed. FIG. 2-2 is an enlarged cross-sectional view in the case when the adhesive sheet is laminated in which the primer coating layer 6 and the release agent layer 7 are employed. As these Figures show, in an adhesive sheet of the present invention, the protrusive surfaces of the elastic micro-ball 3 protruding from the surface of adhesive layer 2 (adhesive composition layer) on the substrate 1 on primer coating layer is entirely covered with the adhesive 4. In this case, the elastic microball 3 is to give the protruding adhesive layer 2 (adhesive composition layer). As shown in FIGS. 2, 2-1 and 2-2, the adhesive layer may be contact with the substrate 1 or the primer coating layer 6, and the adhesive may also come between the substrate 1 and the primer coating layer 6.

As a substrate (A) used in the adhesive sheet of the present invention, there may be usually used a fibrous material such as paper, cloth, non-woven fabric, etc. In addition to these, there may also be used a film whose surface is smooth such as polyethylene, polypropylene, polyester, polyvinyl chloride, cellulose acetate, polycarbonate, cellophane, polyvinylidene fluoride, etc. and a composite substrate thereof. The whole or part of the surface of one side of such a substrate is used as a substratial adhesive layer forming surface and an adhesive composition comprising elastic micro-balls and an adhesive is applied to the adhesive layer-forming surface.

When the adhesive composition is applied to the adhesive layer forming surface, there may be employed a primer coating layer on the surface of the substrate (A) in order to strengthen the adhesiveness between the adhesive layer and the substrate as it may generally be carried out.

Further, a release agent layer may be employed on the opposite side of the substrate (opposite side of the coating of the adhesive) depending upon the occasion demands. In the case when the adhesive sheets are laminated in several layers, each adhesive sheet can easily be taken out for convenience.

On the opposite side of the substrate, a printing layer may also be employed.

The elastic micro-balls (B), which is one of the components of the adhesive composition, plays a role of making wider the contact area of the adhesive layer with an adherend when an adhesive sheet of the present invention is bonded to the adherend. Namely, whereas the elastic micro-balls are protruding from the surface of the adhesive layer when the sheet is not bonded to an adherend, the micro-balls are elastically deformed when the adhesive sheet is bonded with pressure to the adherend, so that the wider portions on surface of the adhesive layer can be bonded to the adherend. Thus, the adhesive sheet of the present invention exhibits a greater adhesion capability than would be the case with a conventional one by so-called point-adhesion. Moreover, the elastic micro-balls themselves have a restoring force, which prevents the adhesion of adhesive sheet to an adherend from becoming too strong and, consequently, the adhesive sheet according to the present invention can be easily removed from an adherend, as well.

The elastic micro-balls (B) may have self-adhesion capability or may not have it at all. In either case, the micro-balls must be elastic bodies. Accordingly, as elastic micro-balls, high molecular polymers whose glass transition temperature is of $-80°$ C. to $10°$ C. may usually be used. As such high molecular polymers, there may be preferably employed a copolymer such as a chain polymer, a graft polymer, a block polymer, a three-dimensional network polymer, etc. In the present invention, there may be used copolymers which may be obtained, for example, from 90 to 99.9 parts by weight of a (meth)acrylic ester and 0.1 to 10 parts by weight of an $\alpha$-olefinic carboxylic acid; copolymers obtained from 2-ethylhexyl acrylate/acrylic acid=98/2, isononyl methacrylate/acrylic acid=97/3, isononyl acrylate/methacrylic acid=96/4; n-octyl acrylate/methacrylic acid=99/1 (wherein the proportion means weight ratio), etc. and cross-linked copolymers thereof.

Here, as a (meth)acrylic ester, there may be specifically exemplified ethyl acrylate, n-propyl acrylate, n-butyl acrylate, isobutyl acrylate, n-octyl acrylate, isooctyl acrylate, 2-ethylhexyl acrylate, n-nonyl acrylate, isononyl acrylate, lauryl acrylate, methyl methacrylate, ethyl methacrylate, n-propyl methacrylate, n-butyl methacrylate, 2-ethylhexyl methacrylate, isononyl methacrylate and lauryl methacrylate. As a 2-monoolefinic carboxylic acid, there may be specifically exemplified an acrylic acid, a methacrylic acid, an itaconic acid and a crotonic acid.

As other polymers to be used here, there may be mentioned, for example, a carboxyl-modified cross-linked polymer of liquid polyisoprene, a cross-linked polymer of liquid polybutadiene having a hydroxyl group at both ends, a cross-linked polymer of liquid polybutadiene having a carboxyl group, a polymer of polyoxy-alkylene compound having an alkoxyl group at both ends, natural rubber, styrene-butadiene rubber, polyisoprene, styrene-isoprene-styrene block copolymer, styrene-ethylene-butylene-styrene copolymer, etc.

As elastic micro-balls (B) comprising a copolymer exemplified above, those having a particle diameter of 0.1 to 1,000 $\mu$m, preferably 1 to 100 $\mu$m (the mean particle diameter is usually 0.5 to 300 $\mu$m, preferably 1 to 100 $\mu$m) are usually used. Micro-balls having such a diameter may be suitably obtained by suspension polymerization using water as medium.

The adhesive (C) which is the other component of the adhesive composition plays a role of bonding the substrate (A) to an adherend and must be tacky at ordinary temperature. As such an adhesive there may be mentioned, for example, a polyacrylic ester copolymer-series adhesive, a polyisobutylene-series adhesive, a styrene-ethylene-butylene-styrene block copolymer-series adhesive, etc.

The above-mentioned elastic micro-balls (B) and the adhesive (C) are formulated at a weight ratio of 1:10 to 10:1, preferably 1:5 to 5:1, to form an adhesive composition. In a case where the weight ratio of the micro-balls relative to the adhesive to be formulated is too small, for example, less than 1/10, the micro-balls protrude from the surface of the adhesive layer to a rather small degree and the adhesive layer becomes almost smooth to make the removal of the adhesive sheet difficult. On the other hand, in a case where the ratio is excessive, for example, more than 10/1, the surface of the protrusive portions of the micro-balls protruding from the surface of the adhesive layer may not be completely covered with the adhesive to make difficult the secured bonding of the adhesive sheet to an adherend.

An adhesive composition comprising the above-mentioned components may be prepared by dispersing a predetermined amount of elastic micro-balls and an adhesive in a volatile organic solvent and stirring the resulting mixture homogeneously. An adhesive sheet of the present invention may be obtained by coating the adhesive layer forming surface of the substrate with such a homogeneous liquid dispersion. Here, as a volatile organic solvent, there may be exemplified toluene, n-hexane, n-heptane, cyclohexane, ethyl acetate, methylethyl ketone, etc. It is preferred that the concentration of micro-balls and adhesive in a liquid preparation of adhesive composition be within the range of 5 to 40 % by weight for the purpose of covering the entire surfaces of micro balls with adhesive. The liquid preparation may be applied to the adhesive layer-forming surface of the substrate so that the thickness of the adhesive layer after the removal of the organic solvent may be usually 0.1 to 100 $\mu$m, preferably 1 to 30 $\mu$m. As a coating method, there may be mentioned, for example, a method wherein a knife coater, a gravure coater, a spray coater or a silk screen coater is used. Since coating is carried out by using the above-mentioned mixed preparative liquid in any one of these method, the protrusive portions of the micro balls are surely covered with the adhesive.

It is preferred that the liquid preparation should be so applied that 100 to 1,000,000 pcs/cm$^2$ of elastic micro-balls are distributed uniformly on the adhesive layer-forming surface of the substrate; more preferably 1,000 to 150,000 pcs./cm$^2$. While dependent on the diameter of elastic micro-balls, the removablity of a sheet is liable to decline when the number of elastic micro-balls is less than 1,000 pcs./cm$^2$. On the other hand, if the number of elastic micro-balls is too great, the micro-balls are densely distributed so that, when the sheet is bonded to an adherend with pressure, adjacent micro-balls will interfere with one another, preventing desirable viscoelastic deformation thereof to impair the balance of adhesion and removability. Thus, in case where the mean particle diameter of the micro-balls is about 30 μm, the number of the micro-balls is preferably 150,000 pcs./cm$^2$ or less for practical uses.

In an adhesive sheet of the present invention, the surface of the adhesive layer can be divided into a part of adhesive which has high adhesion capability and parts of highly viscoelastic micro-balls protruding from the layer, and the protrusive surfaces of the micro-balls themselves are also covered with the adhesive. Since the adhesive force of the protrusive portions of micro-balls which actually come into contact with an adherend is made stronger than would be the case with micro-balls whose protrusive surfaces are not covered with the adhesive, it is possible to markedly reduce the number of micro-balls to be distributed per unit area of the substrate. Accordingly, an adhesive sheet according to the present invention can exhibit a sufficient adhesion capability even when micro-balls are distributed at such lower densities as described above.

On the other hand, the adhesive composition layer may also be distributed in fixed insular patterns so that micro-balls may be dense in part. In this case, although the number of micro-balls may be small as a whole, ideal adhesion and removability can be effected upon actual bonding since the micro-balls center in the insular parts with a preferred density. Accordingly, the number of micro-balls themselves which form the protruded portion coming into actual contact with an adherend can be relatively small. Therefore, it is effectual to distribute the elastic micro-balls within the range as mentioned above in making the adhesive sheet exhibit most excellent repeating capability of bonding and removing.

A removable adhesive sheet of the present invention may be prepared by after coating a substrate with a predetermined amount of the above-mentioned liquid preparation comprising micro-balls and an adhesive, drying usually at 50° to 140° C. for 0.1 to 10 minutes to remove the organic solvent. In this process, it is effective to employ hot-air drying in order to cut down the drying treatment time.

The adhesive layer is usually formed on the surface of one side of a substrate, all over or in part. When the adhesive layer is formed on one end of the substrate, the rest of the substrate can be used as a holding portion, which facilitates removal of the sheet.

Further, in the present invention, an adhesive layer may be formed all over the adhesive layer forming surface of a substrate. However, preferably only 20% to 98% of area in the layer forming surface may be coated with the above-mentioned adhesive composition. It is still more preferred that the area of 20% to 90% be coated with the adhesive composition. The reason why the adhesive layer is not formed all over the adhesive layer forming surface is that, as mentioned above, according to the present invention, the protrusive portions of the elastic micro-balls protruding from the surface of the adhesive layer are covered with the adhesive and hence the adhesive force to an adherend will become too strong if the adhesive layer forming surface of the substrate is entirely formed into an adhesive layer. Therefore, in the present invention, it is preferred to form an adhesive layer on the adhesive layer forming surface in the above-mentioned area percentage.

Figure 3:
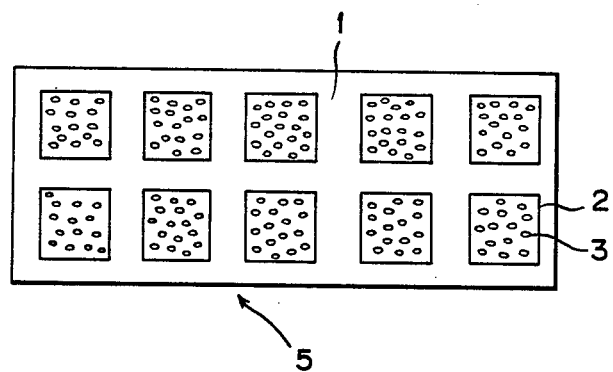
FIGS. 3 to 7 show plan views of removable adhesive sheets of the present invention whose adhesive layers are formed in the patterns of squares (FIG. 3), circles (FIG. 4), ellipses (FIG. 5), triangles (FIG. 6) and pentagons (FIG. 7), respectively.
Figure 4:
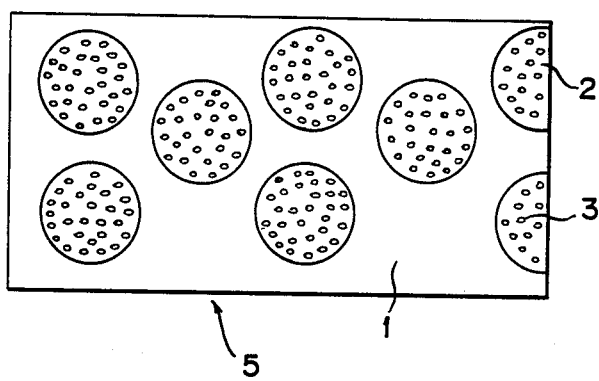
Figure 5:
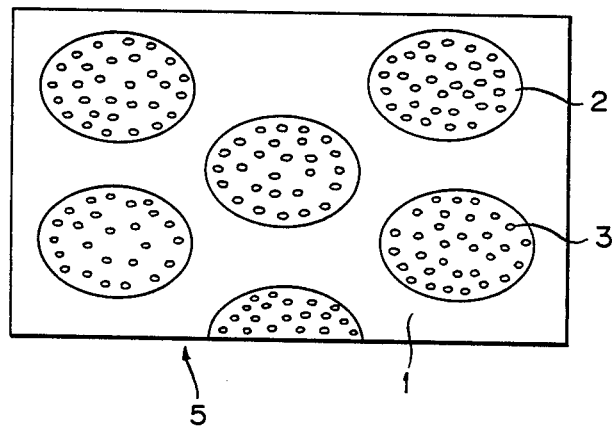
Figure 6:
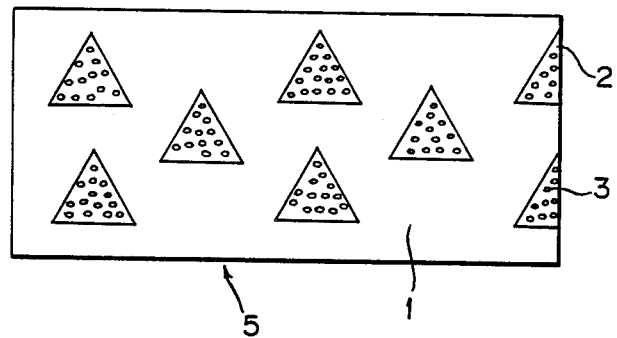
Figure 7:
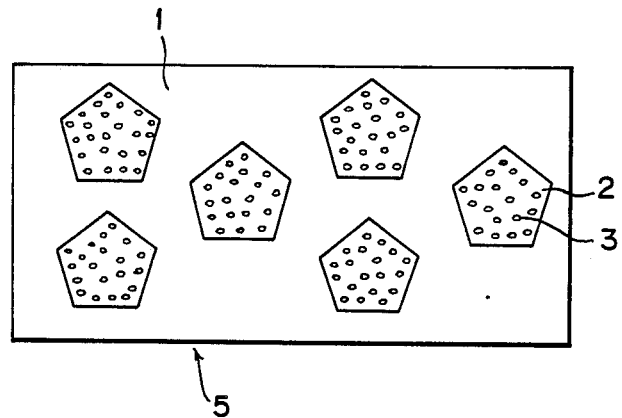
Figure 8:
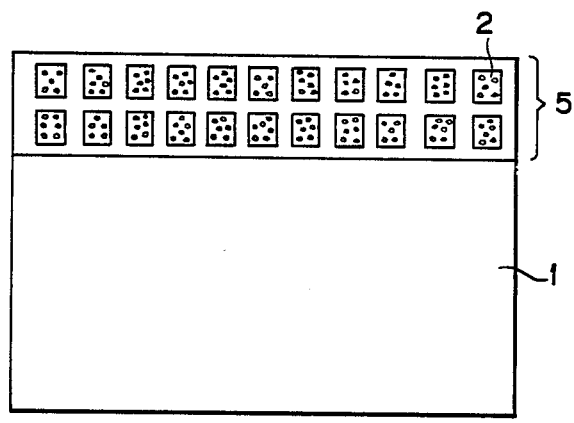
FIGS. 8 to 11 show plan views of removable adhesive sheets of the present invention whose adhesive layers are formed on the upper end of the substrate in the patterns of squares (FIG. 8), wave-like forms (FIG. 9), serrated forms (FIG. 10) and rhombuses (FIG. 11), respectively.
Figure 9:
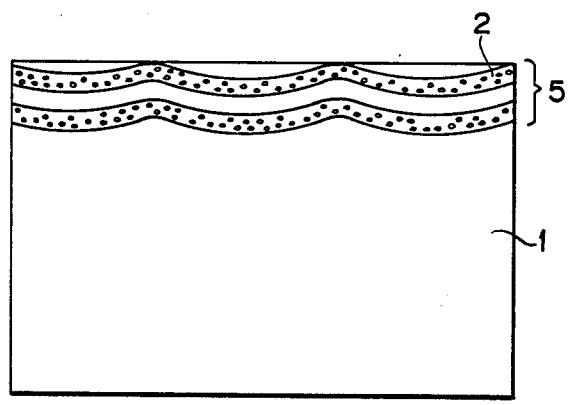
Figure 10:
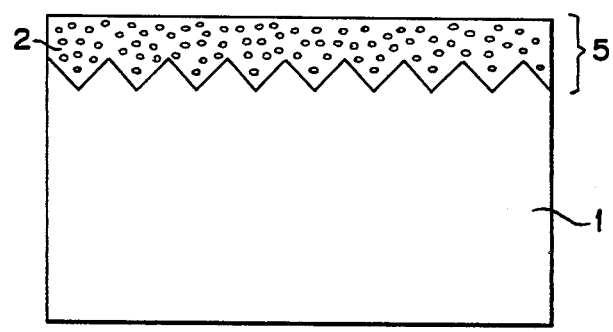
Figure 11:
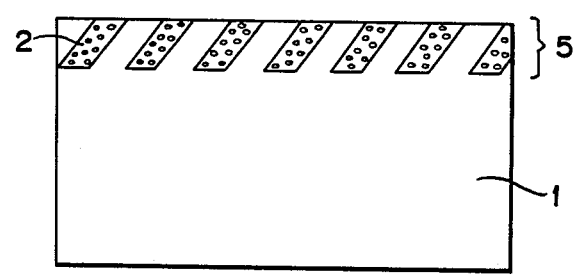

In order to form an adhesive layer with such an area percentage, it is preferred that the adhesive layer 2 is formed in patterns, as shown in FIGS. 3–7, into a number of areas distributed on the adhesive layer forming surface 5 of the substrate. As a shape of the pattern, there may be exemplified a shape such as a square (FIG. 3), a circle (FIG. 4), an ellipse (FIG. 5), a triangle (FIG. 6), a pentagon (FIG. 7), etc. The shape of a pattern to which the adhesive layer is formed is not especially limited so far as the adhesive layer can be formed on the adhesive layer forming surface within the above-mentioned area percentage. FIGS. 8–11 each shows an embodiment wherein an adhesive layer is formed at the upper end of the adhesive layer forming surface 5 of the substrate within the above-mentioned area percentage. Among these Figures, FIG. 8 is an embodiment wherein the adhesive layer is formed using a square pattern as shown in FIG. 3. FIG. 9 is an embodiment wherein the adhesive layer is formed in the pattern of wave-like forms. FIG. 10 is an embodiment wherein the lower edge of the adhesive layer on the adhesive layer forming surface is formed in a serrated pattern. FIG. 11 is an embodiment wherein the adhesive layer is provided in a rhombic patterns discontinuously.

An adhesive sheet of the present invention can be repeatedly bonded to and removed from an adherend such as paper, cloth, plastic, metal, earthenware, porcelain, glass, coated plate, etc. and may be used as memo pad, drawing paper, notebook, voucher, price tag, label for specimen, etc.

The adhesive layer in the present invention is formed, as described above, using the adhesive composition in which elastic micro-balls and adhesive are formulated at such a predetermined proportion that the portions of the elastic micro-balls protruding from the surface of the adhesive layer are coated with the adhesive. Accordingly, the power of the adhesive layer for bonding itself effectively to the adherend becomes remarkably stronger than would be the case with the adhesive layer in which the protrusive portions of micro-balls are not covered with adhesive. Thus, according to the present invention, it is possible to reduce not only the density of elastic micro-balls applied but also the area of the adhesive layer itself to be formed. This leads to the saving of the adhesive composition and a removable adhesive sheet capable of rebonding and removing may be provided at a low cost. In addition, the adhesive sheet of the present invention, in spite of its low cost, is furnished with remarkably excellent rebonding/removing capability.

In the following, the present invention will be described in detail by giving Examples, however, to which the scope of this invention may not be limited.

EXAMPLE 1

A homogeneous liquid dispersion was prepared by dispersing 70 parts by weight of a copolymer of isononyl acrylate/acrylic acid=97/3 (in terms of weight ratio) having the average mean diameter of 30 μm as elastic micro-balls, 30 parts by weight of a copolymer of isononoyl acrylate/butyl acrylate/acrylic acid=44/54/2 (in terms of weight ratio) and 0.1 part by weight of a tolylene diisocyanate as an adhesive in 10 % (by weight) of a toluene, and then the thus obtained solution was applied to the surface of the 70 kg of woodfree paper by means of a knife coater so that the spread thereof after drying may be approximately 15 g/m², further subjected to heat treatment at 120° C. for 5 minutes to obtain a removable adhesive sheet. The adhesion power of this adhesive sheet, as measured in accordance with JIS-Z-1523, was 88 g/cm.

Next, the thus obtained adhesive sheet was bonded to a newspaper and then removed therefrom slowly. Nonetheless, the fibers of the newspaper were not peeled off. After bonding and removing were repeated 50 times on a woodfree paper, the adhesion of the sheet was impaired very little. When the above-treated adhesive sheet was further bonded to a newspaper posted on a wall, the sheet did not fall off even after a day.

The state of the adhesive and the elastic micro-balls on the adhesive sheet was observed using a microscope. There was confirmed a structure that the elastic micro-balls were uniformly distributed almost in a single layer on the woodfree paper with their protrusive surfaces covered with the adhesive. The distribution density of elastic micro-balls per unit area was about 18,000 pcs./cm² in the minimum, about 34,000 pcs./cm² in the maximum, and about 26,000 pcs./cm² on an average. The area percentage of the adhesive layer relative to the adhesive layer-forming surface was almost 100%. The thickness of the adhesive covering the elastic micro-balls was about 1 μm at the thinnest and about 25 μm at the thickest.

COMPARATIVE EXAMPLE 1

A homogeneous liquid dispersion was prepared by dispersing the same adhesive as used in Example 1, i.e., 100 parts by weight of a copolymer of isononyl acrylate/butyl acrylate/acrylic acid=44/54/2 (in terms of weight ratio) and 0.1 part by weight of a tolylene diisocyanate, in 10% (by weight) of a toluene, and then the thus obtained solution was applied to the surface of 70 kg of woodfree paper by means of a knife coater so that the spread thereof after drying may be approximately 10 g/m², further subjected to heat treatment at 120° C. for 5 minutes to obtain an adhesive sheet. The adhesion power of the adhesive sheet, as measured in accordance with JIS-Z-1523, was 204 g/cm. When the thus obtained adhesive sheet was bonded to a newspaper and removed therefrom slowly, the fibers of the newspaper were peeled off in a large amount. Further, the sheet exhibited very little adhesion when rebonded. Bonding and removing were repeated on a woodfree paper, and from around the 15th time the adhesion of the surface of the adhesive ceased to be felt. After repeating bonding and removing 20 times, the sheet was bonded to a newspaper posted on a wall. The sheet fell off within a minute.

The state of the adhesive on the adhesive sheet was observed using a microscope. There was observed a uniformly plain adhesive layer and the percentage of the adhesive layer relative to the adhesive layer-forming surface was 100%.

From the above results, it is obvious that the structure according to the present invention in which the surfaces of the elastic micro-balls are covered with the adhesive has effected an ideal adhesion and removability.

EXAMPLE 2

A homogeneous liquid dispersion was prepared by dispersing 70 parts by weight of the same copolymer as used in Example 1 as elastic micro-balls, 30 parts by weight of the same copolymer as used in Example 1 and 0.1 part by weight of a tolylene diisocyanate as an adhesive in 8 % (by weight) of a toluene, and then the thus obtained solution was applied to the surface of the 70 kg of woodfree paper by means of a knife through a gauze (screen) so that the spread thereof after drying might be approximately 5 g/m², further subjected to heat treatment at 120° C. for 5 minutes to obtain a removable adhesive sheet. The adhesion of this adhesive sheet, as measured in accordance with JIS-Z-1523, was 80 g/cm.

When the thus obtained adhesive sheet was bonded to a newspaper and then removed therefrom slowly, the fibers of the newspaper were not peeled off. After bonding and removing were repeated 50 times on a woodfree paper, the adhesion of the sheet was maintained sufficiently. When the adhesive sheet was further bonded to a newspaper posted on a wall, the sheet did not fall off even after a day.

The state of the adhesive and the elastic micro-balls on the adhesive sheet was observed using a microscope. There was observed a structure in which the adhesive layer had been formed on the woodfree paper in the pattern of circles having a radius of 300 μm and therein almost one single layer of elastic micro-balls had been coated with the adhesive. The percentage of the area of the adhesive layer relative to that of the adhesive layer forming surface was approximately 28%. The number of the elastic micro-balls per unit area was about 4,900 pcs./cm² in the minimum, about 10,300 pcs./cm² in the maximum, and about 8,500 pcs./cm² on an average.

Thus, the spread of the adhesive has been reduced to ½ and the number of elastic micro-balls has also been reduced to ⅓ as compared with the case wherein the percentage of the area of the adhesive layer relative to adhesive layer-forming surface was 100%. However, it was confirmed that the adhesion of the adhesive layer had been changed little and the removability was also excellent.

EXAMPLE 3

The same liquid dispersion as used in Example 2, prepared by dispersing elastic micro-balls and an adhesive in 8% (by weight) of a toluene, was used to coat the surface of 70 kg of woodfree paper therewith by means of a knife through a gauze (screen) of a little larger mesh than the one used in Example 2 so that the spread after drying may be approximately 10 g/m², and then subjected to heat treatment at 120° C. for 5 minutes to obtain a removable adhesive sheet. The adhesion of the adhesive sheet, as measured in accordance with JIS-Z-1523, was 85 g/cm.

The adhesive sheet was bonded to a newspaper and then removed therefrom slowly. None the less, the fibers of the newspaper were not peeled off. After bonding and removing was repeated on a woodfree paper 50 times, the adhesion of the sheet was maintained sufficiently. When the adhesive sheet was further bonded to a newspaper posted on a wall, the sheet did not fall off even after a day.

The state of the adhesive layer and the elastic micro-balls on the adhesive sheet was observed using a microscope. There was observed a structure in which the adhesive layer had been formed on the woodfree paper in the pattern of circles having a radius of approximately 500 μm and therein almost one single layer of eleastic micro-balls had been coated with the adhesive. The percentage of the area of the adhesive composition layer relative to the adhesive layer forming surface was about 79%. The number of the elastic micro-balls per unit area was about 6,100 pcs./cm² at the minimum, about 21,400 pcs./cm² at the maximum, and about 17,000 pcs./cm² on an average. The thickness of the adhesive covering the elastic micro-balls was about 1 μm at the thinnest and about 25 μm at the thickest.

Thus, it was confirmed that the adhesion of the sheet obtained according to this Example had been changed very little compared with the case where the area percentage of the adhesive composition layer relative to the adhesive layer-forming surface was 100%, and that the removability thereof was also excellent.

We claim:

1. A removable adhesive sheet comprising a substrate (A) and an adhesive composition layer which comprises elastically deformable micro-balls (B), said micro-balls having a glass transition temperature ranging between −80° and 10° C., and an adhesive (C), the adhesive composition layer being formed on an adhesive layer-forming surface of the substrate, wherein (i) the mixing proportion of the elastic micro-balls (B) to the adhesive (C) in the adhesive composition layer is 1:10 to 10:1 in terms weight ratio and (ii) the protrusive areas of the elastic microballs (B) partially protruding form the surface of the adhesive composition layer is entirely covered with the adhesive (C), such that the adhesive sheet is repeatedly removable from contact between the adhesive composition layer and a surface.

2. The removable adhesive sheet according to claim 1, wherein the particle diameter of the elastically deformable micro-balls (B) in the adhesive composition layer is 0.1 to 1,000 μm.

3. The removable adhesive sheet according to claim 1, wherein the thickness of said adhesive composition layer is 0.1 to 100 μm.

4. The removable adhesive sheet according to claim 1 wherein 100 to 1,000,000 pcs./cm² of the elastically deformable micro-balls (B) are distributed on the adhesive layer-forming surface of the substrate (A).

5. The removable adhesive sheet according to claim 1, wherein the adhesive composition layer is formed separately to have distributed areas on the adhesive layer forming surface of the substrate (A), and the percentage of the area of the adhesive composition layer relative to the adhesive layer-forming surface is 20 to 98%.

6. The removable adhesive sheet according to claim 1, wherein the mixing proportion of the elastic micro-balls (B) to the adhesive (C) in the adhesive composition layer is 1:5 to 5:1.

7. The removable adhesive sheet according to claim 2, wherein the particle diameter of the elastically deformable micro-balls (B) is 0.5 to 300 μm.

8. The removable adhesive sheet according to claim 3, wherein the thickness of the adhesive composition layer is 1 to 30 μm.

9. The removable adhesive sheet according to claim 4, wherein 1,000 to 150,000 pcs./cm² of the elastically deformable micro-balls (B) are distributed on the adhesive layer-forming surface of the substrate (A).

10. The removable adhesive sheet according to claim 5, wherein the percentage of the area of the adhesive composition layer relative to the adhesive layer-forming surface is of 20% to 90%.

11. The removable adhesive sheet according to claim 1, wherein the substrate (A) is a fibrous material or a film whose surface is smooth.

12. The removable adhesive sheet according to claim 1, wherein the elastically deformable micro-balls are comprised of high molecular polymers selected from a chain polymer, a graft polymer, a block polymer and a three-dimensional network polymer.

13. The removable adhesive sheet according to claim 1, wherein the elastically deformable micro-balls are the product of a process comprising the step of suspension polymerization of said micro-balls in water.

* * * * *